United States Patent Office 3,092,951
Patented June 11, 1963

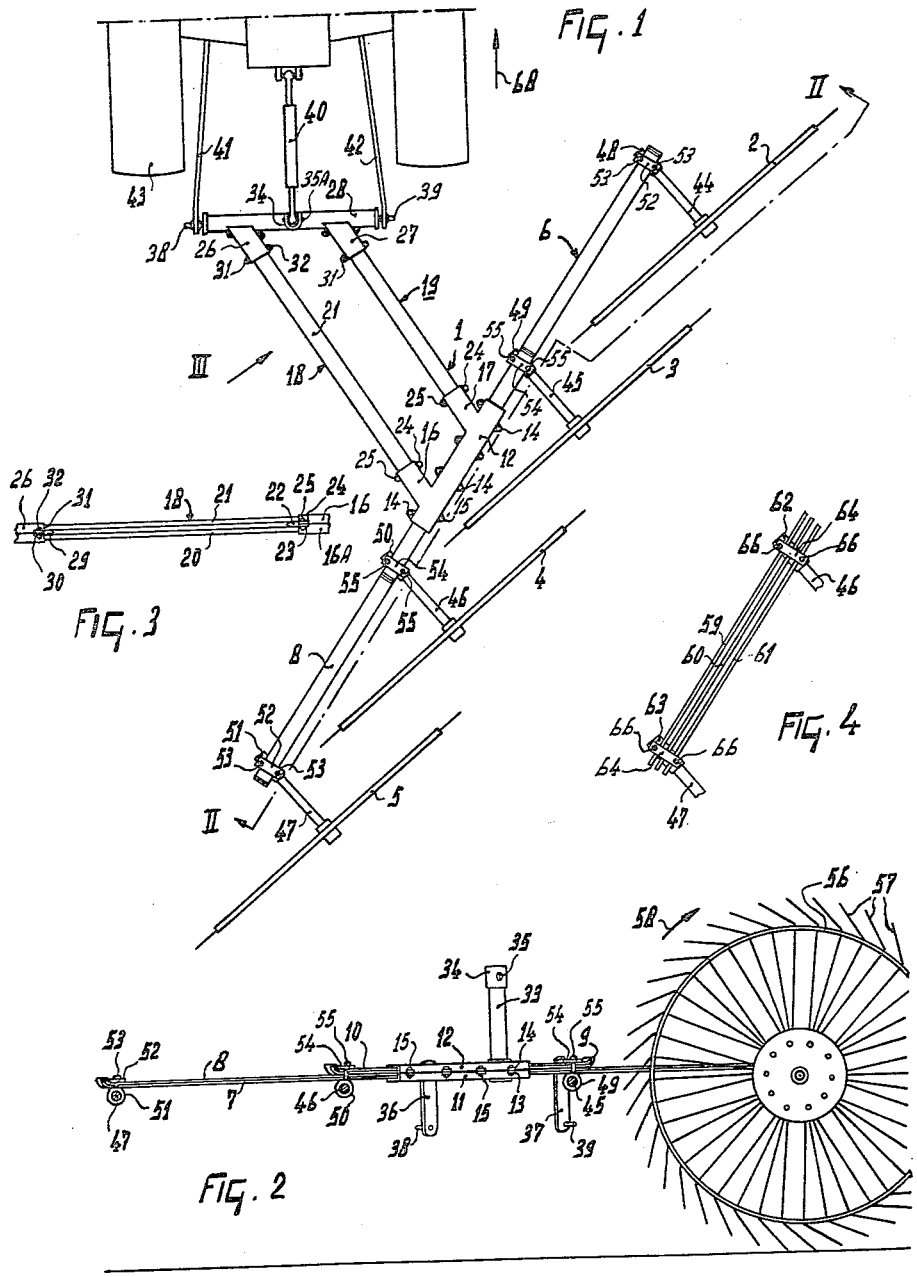

3,092,951
IMPLEMENTS FOR LATERALLY DISPLACING
CROP LYING ON THE GROUND
Cornelis van der Lely, Zug, Switzerland, assignor to C.
van der Lely, N.V., Maasland, Netherlands, a limited-
liability company of the Netherlands
Filed Apr. 19, 1961, Ser. No. 104,064
Claims priority, application Netherlands May 6, 1960
8 Claims. (Cl. 56—377)

This invention relates to an implement for laterally displacing crop or like material lying on the ground, the implement being of the kind which includes a frame and at least one rotary crop-working member.

According to the present invention there is provided an implement of the kind set forth, wherein the frame has at least one frame beam which is constituted by one or more resilient strips or rods, the arrangement being such that the crop-working member may move to accommodate ground irregularities by virtue of the resiliency of the said frame beam.

An implement having a frame constructed in this way is capable of more readily working crop or like material lying on uneven ground.

For a better understanding of the invention and to show how the same may be carried into effect reference will now be made, by way of example, to the accompanying drawing, in which:

FIGURE 1 is a plan view of an implement according to the invention,

FIGURE 2 is an elevation of the implement as seen in the direction of arrows II—II of FIGURE 1, parts of which are in section, FIGURE 3 is an elevational view of a detail of the implement as seen in the direction of arrow III of FIGURE 1, and FIGURE 4 is a plan view of an alternative construction of a part of the implement.

Referring now to FIGURES 1 to 3, there is shown an implement which comprises a frame 1 and four crop-working members 2, 3, 4 and 5. The frame 1 includes a frame beam 6, which is adapted to carry the crop-working members and is constructed from four strips or bars 7, 8, 9 and 10. The strips 7 and 8 are of the same length and lie one on top of the other with their broadest surfaces in abutting engagement. The strips 9 and 10 are similarly arranged, are of equal length, but, shorter than the strips 7 and 8 strips 7 and 8 constitute one group and strips 9 and 10 comprise another group which is superposed on the first group. The strips 9 and 10 are arranged to lie centraly on top of the strips 7 and 8. All the strips 7, 8, 9 and 10 are parallel to each other and constitute a composite frame beam 6 which is capable of resilient deflection in a vertical direction.

Two clamping members 11 and 12 which have channel-shaped cross-sections are arranged below and above the strips 7, 8, 9 and 10 at substantialy the centre of the latter. The clamping member 12 has two integral extensions 16 and 17 which also have channel-shaped cross-sections. The clamping member 11 is of similar construction to that of the clamping member 12 and has similar integral extensions which lie beneath the extensions 16 and 17 in FIGURE 1. One of the extensions on the clamping member 11 can be seen at 16A in FIGURE 3. The clamping member 12 is a mirror image of the clamping member 11, so that when they are placed together with the bases of their corresponding channels remote from each other, the two clamping members 11 and 12 constitute a tubular element which is capable of receiving the strips 7, 8, 9 and 10. The two clamping members 11 and 12 are formed with a plurality of lugs 13 and 14 respectively. The lugs 13 and 14 are arranged to coincide with each other and are formed with aligned holes which are adapted to receive bolts 15. The strips 7, 8, 9 and 10 can thus be clamped together in close contact by bolting the clamping members 11 and 12 about them.

The clamping member 12 together with its channel-shaped extensions 16 and 17 lie in a substantially horizontal plane which is above a substantially horizontal plane which contains the clamping member 11 and its channel-shaped extensions. The said extensions are disposed transversely to their corresponding clamping members 11 and 12 and at an angle of substantially 70° thereto. The extensions are adapted to receive two frame beams 18 and 19, and can be clamped therein with the aid of bolts 25 which are passed through aligned holes formed in lugs 23 and 24 formed on the said extensions. The free ends of the beams 18 and 19 are clamped in a similar manner by clamping members 26 and 27 which latter two clamping members are rigidly secured to a fastening member 28 and extend transversely to the latter at an angle of substantially 60° thereto. The clamping members 26 and 27 are provided with lugs 30 and 31 having aligned holes which are adapted to receive bolts 32.

The beams 18 and 19 are similar in construction and consist of two parallel strips or bars 20 and 21 which are spaced apart by spacers 22 and 29. The spacers 22 and 29 are located between the strips 20 and 21 at each end thereof and are clamped with the strips 20 and 21 between their corresponding clamping members. The thickness of the two strips 20 and 21, together with either one of the spacers 22 and 29, is substantially the same as the thickness of the four strips 7, 8, 9 and 10. The flexibility of the frame beams can be varied by altering the distance between the strips.

The fastening member 28 is provided at its centre with an upstanding post 33, at the top of which there is secured a U-shaped bracket 34, the limbs of which are formed with aligned holes 35 through which a pin 35A can be passed. The ends of the fastening member 28 have secured thereto two downwardly projecting bars 36 and 37, which two bars 36 and 37 are provided, at their lower ends, with a pin 38 and 39 respectively. Each pin 38 and 39 projects outwardly from its corresponding bar 36 and 37. With the aid of the U-shaped bracket 34 and the pin 35A, together with the pins 38 and 39, the fastening device 28 can be secured to the three links 40, 41 and 42 respectively of the three-point lifting device of a tractor 43.

The crop-working members 2, 3, 4 and 5 are adapted to rotate about a substantially horizontal axis of rotation afforded by supporting axles 44, 45, 46 and 47 respectively. The frame beam 6 has secured thereto sleeves 48, 49, 50 and 51 within which are directly secured the axles 44, 45, 46 and 47 respectively. Each sleeve 48, 49, 50 and 51 is formed with a flat surface which contacts the underside of the frame beam 6. The flat surfaces of the sleeves 48 and 51 are formed with threaded holes which receive bolts 53, the said bolts having first been passed through holes formed in plates 52 which are disposed above the strips 7 and 8 of the frame beam 6. The flat surfaces of the sleeves 49 and 50 are similarly formed with threaded holes and are similarly secured to the strips 7, 8, 9 and 10 of the frame beam 6 by plates 54 and bolts 55. All the sleeves 48 to 51 are parallel to one another and are mounted on the frame beam 6 with their longitudinal axes at an angle of less than 90° to the longitudinal axis of the said frame beam.

As illustrated in FIGURES 1 and 2, the crop working members are rake wheels which are provided with rims 56 and tines 57. The tines 57 are bent rearwardly with rspect to the intended direction of rotation (shown by the arrow 58) of the rake wheels, so that the tip of each tine will lag behind the root thereof, and any crop or like material encountered by the rake wheels, when the implement is in use, will be dropped from the rising side of the rake wheel.

Referring now to FIGURE 4, there is here shown an alternative arrangement of the frame beam 6 in which the frame beam is made up of three rods 59, 60 and 61, each of circular cross-section. The axles 46 and 47 are received in sleeves 62 and 63, the upper surfaces of which may be grooved for the reception of the rods 59, 60 and 61 so that the latter are spaced apart from each other. The manner of securing the sleeves 62 and 63 to the frame beam 6 is similar to the previous embodiment, the connection being made with the aid of plates 64 and bolts 66. This arrangement allows the frame beam 6 to be deflected in a horizontal direction as well as in a vertical direction.

When the implement is drawn in the direction of the arrow 68, the rake wheels will rotate in the direction of the arrow 58, by contacting the ground or crop lying thereon. In this way the crop will be delivered from right to left, with respect to the intended direction of travel 68, so that crop encountered by the rake wheel 2 will be passed into the path of travel of the rake wheel 3 which, in turn, will deliver the crop to the rake wheel 4 which, similarly, passes the crop to the rake wheel 5, the crop finally being displaced laterally of the implement in the form of a windrow. As the frame beam 6 and the frame beams 18 and 19 are so constructed that they can be resiliently deflected in a vertical direction the rake wheels can more readily work crop lying on uneven ground. The pressure of the rake wheels on the ground or crop lying thereon can be altered by raising the implement with the aid of the three-point lifting device.

During operation of the implement the strips 7, 8, 9 and 10 of the frame beam 6, when deflected in a vertical direction, may slide relatively to one another. It is, therefore, necessary to ensure that the sleeves 48, 49, 50 and 51 are secured to the frame beam 6 in such a manner that such sliding movement of the strips 7, 8, 9 and 10 can take place and they are only loosely bolted to the said frame beam 6. In order to prevent movement of the sleeves 48, 49, 50 and 51, along the frame beam 6, they are provided with upstanding abutments which are adapted to be received in holes formed in the strip 7, the said abutment being no longer than the thickness of the strip 7.

The ends of the strips 7, 8, 9 and 10 are turned upwardly to present curved surfaces over which the other strips can bend when an upward force is applied. This shaping of the ends of the strips will thus mitigate permanent deformation of the strips, as may be the case if the strips were to bend about a straight edge. The edges of the clamping members 11 and 12 may also be rounded off for the same purpose. As the strips 20 and 21 forming the frame beams 18 and 19 are spaced apart, they will also be capable of resilient deflection in a vertical direction. Such deflection will occur primarily at the locations where the clamping members 26 and 27, and the extensions upon the clamping members 11 and 12, embrace the strips 20 and 21, so that at these locations the edges are preferably rounded off. The edges of the spacers 22 and 29 may also be rounded for this purpose, as shown in FIGURE 3.

The frame beams of the implement may be constructed in any manner which will allow them to bend easily when a force is applied thereto. The frame may also be constituted by a combination of rods and strips. It will be appreciated that, although the rake wheels have their axles directly connected to the frame, the rake wheels can move to accommodate ground irregularities by virtue of the flexible nature of the frame.

The frame of the implement need not necessarily have all its frame beams constructed so that they are flexible. For example, a frame is envisaged in which only the frame beam 6, carrying the crop-working members, is made flexible, whilst the other frame beams are substantially rigid.

The word "strip" in the claims is introduced to include both strips or rods.

Although in the drawing the implement shown is provided with a fastening device appropriate for the connection thereof to the lifting device of a tractor, it will be understood that the implement could also be provided alternatively, or additionally, with a fastening device permitting the implement to be coupled to a conventional towing beam of a tractor having no lifting device. In this alternative arrangement the implement would, of course, be provided with ground wheels and would be supported wholly, or partly, on the said ground wheels.

What I claim is:

1. An implement for displacing material lying on the ground, said implement having at least one frame beam provided with a plurality of spaced rake wheel supporting means fixed thereon, rake wheels mounted on said supporting means, said frame including a resilient strip, at least one of said rake wheel supporting means being supported by said resilient strip, whereby said rake wheels may move to accommodate ground irregularities by virtue of the resiliency of said resilient strip.

2. An implement for displacing material lying on the ground, said implement having at least one frame beam provided with a plurality of spaced rake wheel supporting means fixed thereon, rake wheels mounted on said supporting means, said frame including a resilient rod, at least one of said rake wheel supporting means being supported by said resilient rod whereby said rake wheels may move to accommodate ground irregularities by virtue of the resiliency of said resilient rod.

3. An implement for displacing material lying on the ground, said implement having at least one frame beam provided with a plurality of spaced rake wheel supporting means fixed thereon, rake wheels mounted on said supporting means, said frame including a plurality of superposed strips, at least one of said rake wheel supporting means being supported by said resilient strips whereby said rake wheels may move to accommodate ground irregularities by virtue of the resiliency of the said resilient strips.

4. An implement for displacing material lying on the ground, said implement having at least one frame beam provided with a plurality of spaced rake wheel supporting means affixed thereon, rake wheels mounted on said supporting means, said frame including a plurality of superposed rods, at least one of said rake wheel supporting means being supported by said resilient rods whereby said rake wheels may move to accommodate ground irregularities by virtue of resiliency of the said resilient rods.

5. The structure of claim 4 whereby means is provided for spacing said rods from each other.

6. The structure of claim 3 wherein said strips are provided with broad surfaces lying in horizontal planes.

7. The structure of claim 3 wherein said strips are arranged in groups, one of said groups being of greater length than the other of said groups, the shorter group at least partially overlying the longer group.

8. The structure of claim 1 wherein said rake wheel supporting means includes clamping means clamping said supporting means to said resilient strip.

References Cited in the file of this patent
UNITED STATES PATENTS
2,860,478    Van der Lely et al. _____ Nov. 18, 1958